June 24, 1958

T. P. FARKAS 2,840,097

TANK LEVEL EQUALIZER

Filed Dec. 30, 1953

INVENTOR
THOMAS P. FARKAS
BY Harris E. Luther
ATTORNEY

June 24, 1958  T. P. FARKAS  2,840,097
TANK LEVEL EQUALIZER
Filed Dec. 30, 1953  3 Sheets-Sheet 2

INVENTOR
THOMAS P. FARKAS
BY Harris G. Luther
ATTORNEY

June 24, 1958  T. P. FARKAS  2,840,097
TANK LEVEL EQUALIZER
Filed Dec. 30, 1953  3 Sheets-Sheet 3

INVENTOR
THOMAS P. FARKAS
BY Harris G. Luther
ATTORNEY

United States Patent Office 2,840,097
Patented June 24, 1958

2,840,097

TANK LEVEL EQUALIZER

Thomas P. Farkas, Bloomfield, Conn., assignor to United Aircraft Corporation, East Hartford, Conn., a corporation of Delaware Application December 30, 1953, Serial No. 401,327

22 Claims. (Cl. 137—98)

This invention relates to tank leveling mechanism and particularly to mechanism for detecting the fluid level in each of several tanks and adjusting the fluid flow from the tanks in accordance with the detected fluid level so as to equalize the fluid level in the several tanks.

An object of this invention is the provision of means for automatically controlling the fluid level in several tanks.

A further object is to maintain, in a group of interconnected tanks, the ratio of the fluid weight in any tank to the weight of the fluid in said tank when full substantially equal to said ratio for any other tank.

A still further object is to automatically regulate the flow from all of several different sized, spaced, interconnected fuel tanks in an airplane so as to maintain the weight ratio of the fuel in the several tanks and avoid shifting of the resultant center of gravity of the full load.

Other objects and advantages will be apparent from the following specification and from the accompanying drawings in which.

In some airplanes in which the fuel load is an important portion of the total weight of the airplane and in which the fuel is carried in tanks in various parts of the airplane such as in the wings and in spaced apart portions of the fuselage, it has been customary to withdraw fuel simultaneously from all of the tanks and rely upon the withdrawing mechanism, such as the pumps and the piping, to regulate the flow so as to empty the tanks at about the same rate. It has been found, however, that it is practically impossible to so regulate a flow, and some tanks will empty faster than others so that while the tank in one wing may be empty, the tank in another wing may still have an appreciable amount of fuel therein thus rendering that wing heavy or in effect shifting the center of gravity of the fuel load. In some planes in particular such as fighters, this shift in the center of gravity is a serious disadvantage affecting the control and maneuverability of the plane and in order to correct the unequal fuel flow from the several tanks the pilot is required to observe another set of instruments, such as fuel gauges, and then adjust fuel valves so as to endeavor to again trim the ship.

Figure 1:
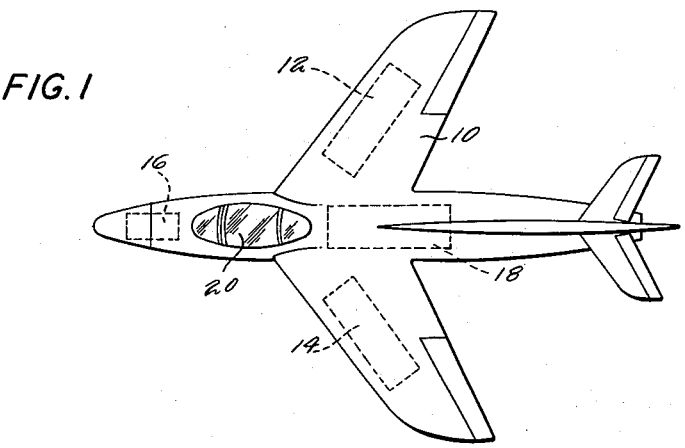
Fig. 1 is a plan view of an airplane, indicating the possible position of several fuel tanks.

Applicant has discovered that it is possible to utilize the fuel level detecting mechanism, such as is used for energizing the fuel gauges or indicators in the airplane, to provide a signal and to utilize this signal in a comparing circuit to provide a reference signal. The tank level signal may then be compared with the reference signal in such a way as to provide a flow controlling or valve actuating signal automatically controlling the outflow from each tank in accordance with the relation of the level of the fuel in that tank to the level of the fuel in other tanks. The fluid level in each tank is an indication of the weight of the fuel in that tank, and hence by a proper selection of the relative levels maintained in the several tanks, it is possible to control the center of gravity of the fuel load. As shown in Fig. 1, an airplane 10 may have a fuel tank 12 in one wing and a fuel tank 14 in the opposite wing. There may also be a fuel tank 16 in the nose of the airplane and a fuel tank 18 back of the pilot's compartment 20. These spaced apart tanks, which may be of several different shapes and capacities and even in level flight located on several different levels, will have a combined center of gravity which in a light airplane may be close to the center of gravity of the airplane without fuel load. It will be obvious that if the tank 16, which may be of a smaller capacity than the tank 18, were to empty first, there would be a shifting of the center of gravity toward the tail of the plane thus making the tail heavy and the nose light and making the plane more difficult to maneuver.

It is customary to connect all of these tanks to a manifold leading to the engine fuel control mechanism and to feed fuel simultaneously from all or a selected number of the tanks to this manifold. While four tanks have been indicated in order to illustrate the problem and its solution, it will be understood that a greater or lesser number of tanks could be used and that the mechanism about to be described would be equally effective irrespective of the number of different tanks or their shape or capacity.

The mechanism utilized in creating a signal responsive to the fluid level in a tank is a transducer generally indicated at 22. This transducer may take many forms and in Fig. 2 it is shown as comprising an alternating current source 24 connected across a potentiometer 26, one end of which is grounded at 28. A slider 30 pivoted at 32 is moved by float 34 across potentiometer 26 in accordance with the level of the fluid 36 confined in tank 38 and supporting the float 34. A similar transducer is provided in each of the tanks 40 and 42.

A lead from slider 30 in tank 38 is connected through a rectifier 44 with a common line 46. A similar connection is made from the slider in tank 40 through rectifier 48 and from the slider in tank 42 through rectifier 50 to the common line 46. A filter 52 is connected with the common line 46 to smooth out ripples and provide a voltage in line 46 substantially equal to the largest voltage of the several potentiometers in the tanks 38, 40 and 42. The arrow in the rectifiers indicates the direction of current travel which in this application is considered as from plus to minus. Hence the line 46 will be at a plus potential with respect to ground and the value of this potential will be determined by the tank having the highest level.

A rectifier 54 is also connected with the slider 30 of tank 38 but in the opposite direction to rectifier 44. A filtering condenser 56 is connected between rectifier 54 and ground so that line 58 will be charged to a negative potential with respect to ground with the potential determined by the level of the fluid in tank 38. Similarly rectifier 60 and condenser 62 are connected with the transducer in tank 40 to charge line 64, and rectifier 66 and condenser 68 are connected with the transducer in tank 42 to charge line 70. The negative potential of line 64 is an indication of the level in tank 40 and the negative potential of line 70 is an indication of the fluid level in tank 42. The output of rectifier 54 is compared through resitances 72 and 74 with the potential of line 46. The resultant of this comparison is led through line 76 to amplifier 78. Assuming that the level in tank 42 is the greatest, the signal produced by rectifier 50 would be the positive signal appearing on line 46. The signal produced in line 58 by rectifier 54 would be a smaller negative signal as the level of tank 38 would be less than the level of tank 42. Assuming resistances 72 and 74 to be equal, the resultant voltage appearing in line 76 would be a positive voltage and an indication of the differences in level between the fluids in tanks 38 and 42 and an indication of how much lower the level in tank 38 was than the level in tank 42. Similarly, if the fluid level in tank 40 was less than the fluid level in tank 42 but higher than the fluid level in tank 38, the negative signal produced in line 64 would be numerically less than the positive signal produced in line 46, but greater than the signal produced in line 58. Hence assuming that the resistances 80 and 82 are equal, the signal produced in line 84 would be positive and would be forwarded to the amplifier 86. The positive signal in line 84 would however be less than the positive signal in line 76.

Coming now to tank 42 which is assumed to have the highest level, the negative signal in line 70 would be numerically equal to the positive signal in line 46 and hence assuming the resistances 88 and 90 to be equal, there would be no signal produced in line 92 leading to the amplifier. From the above description it will be apparent that mechanism has been provided by which a signal can be produced giving an indication of the level in each of several tanks as compared with the level in another tank. It will also be apparent that the tank which is selected as a master to which the others are compared is automatically selected and will automatically change to any other tank when the level of the fluid in that other tank is the highest of the group.

It will be appreciated that in referring to the level of the fluid in a tank, the level is an indication of the ratio of the quantity of fluid remaining to the quantity of fluid in the same tank when full. Thus although one tank may be at a higher elevation than another, for the purpose of this application, the fluid in the one tank would be considered to be at the same level as the fluid of the other tank if the fluid remaining in each tank was the same proportion of the full capacity of the respective tank. This level is also intended to cover the case of vertically irregularly shaped tanks so that those tanks would be considered as being at the same level when each contained the same proportion of the full capacity of their respective tank. It will be appreciated that by use of either appropriate lever mechanism or appropriate potentiometer rates or other variable mechanisms well known in the art, it will be possible to produce signals which are true indications of fluid quantity although those signals may be actually derived from the fluid level in the tank and the tanks are of irregular shape.

Fluid is pumped from the tanks 38, 40 and 42 by pumps 96, 98 and 100, respectively, and the pumped fluid after passing through suitable valve mechanism, to be described later, is led into a manifold 102 leading to the fuel consuming device indicated as engine 104. The valve mechanism is the same for all three tanks and is indicated generally at 106 and is schematically shown in detail on the outlet from pump 96. These valves are designed to control the output of the pumps, which are preferably centrifugal pumps so that their output may be controlled by restrictions in the pump outlet. If some other type of pump such as a gear pump or other positive displacement pump were used, the control could be placed in a by-pass around the pump or a restriction could be placed in the outlet and combined with a pressure relief valve around the pump to control the quantity of fuel led to the manifold 102.

Valve mechanism 106 comprises a proportional solenoid 108 which is energized by the output of amplifier 78 to control the position of a flapper valve 110 pivoted at 112 and spring pulled by spring 114 to open the orifice in the end of line 116 leading from the pump outlet.

A valve 118 is urged by spring 120 to a closed position in which it blocks discharge line 122 from the pump 96. A branch 124 is led from line 116 to the back side of a diaphragm 126 secured to valve 118 to assist spring 120 in closing valve 118. A fixed orifice 127 is provided in line 116. A line 128 leads from the interior of a closed chamber 130, containing the flapper valve 110, to the manifold 102.

With no signal on the proportional solenoid 108, valve 110 will take a position spaced from the open end of pipe 116 so that the discharge from pipe 116 will produce a pressure drop across the orifice 127. Opening of the end of discharge pipe 116 will therefore reduce the pressure in the chamber back of diaphragm 126 to substantially the pressure level existing in chamber 130 and lines 128 and 102, thus permitting valve 118 to open and pass fuel at the maximum rate. A signal from the amplifier to the proportional solenoid which, as pointed out above, is, in the modification of Fig. 2, always of one preselected polarity, will overcome the spring 114 and move the flapper valve 110 toward the open end of pipe 116 to restrict the flow out of that pipe and therefore increase the pressure in lines 116, 124 and the chamber back of the diaphragm 126. This will urge valve 116 towards closed position and thus restrict the flow from the pump 96, reducing the flow from the associated tank. As has been pointed out above, the positive signals are received only from the tanks which are at a lower level than the tank acting as the master at the moment. Therefore, the signal will restrict the flow from the tanks at the lower level which will of course produce a larger proportionate flow from the tanks at the higher level to thus equalize the levels in the several tanks.

The proportional solenoid 108 is a structure utilizing a pair of electro magnets 132 and 134 and a permanent magnet 136 spaced therebetween. The flapper valve 110 serves to complete the magnetic flux path in a manner described in more detail in Patent No. 2,579,723, Magnetic Device, and Offner application No. 68,862, filed January 3, 1949. This device provides a solenoid in which the force exerted upon the pivoted valve or armature 110 is substantially proportional to the signal sent into the solenoid so that the valve 110 will be positioned in accordance with the strength of the signal. This will provide a mechanism in which the flow will be substantially directly proportioned to the level of the fluid in the tank.

Any fluid escape from the open end of pipe 116 is bled through line 128 to the manifold 102. This bleed will of course tend to maintain the pressure in chamber 130 containing the valve 110 at the manifold pressure so that the pressure in line 122 will always have to be a predetermined amount above the manifold pressure even when valve 110 is fully open. Solenoid valves 138 and 140 are similar to the valves 106 and function in the same manner. Detailed descriptions of these valves are omitted in order to simplify this description.

From the above description it will be appreciated that I have provided a structure which will respond to the fluid level in each of several tanks and provide a reference signal or voltage based on the fluid level in the tank having the highest level and will provide valve actuating signals for each of the other tanks which will actuate valves to restrict the flow of fluid from the lower level tanks thus tending to bring all the tanks to the same level. It will be noted that, if desired, it can be arranged so that at no time is the fuel completely shut off from any tank unless its pump is disabled and that the valves are actuated only to change the rate of flow in accordance with the difference between the particular tank level and the reference tank level. This would be accomplished by making the area of the diaphragm 126 smaller than the area of valve 118. In the event of failure of any pump, spring 120 will close valve 118 and prevent reverse flow of fuel through line 122 back into the inoperative tank. Flow through line 128 is so small as to be negligible.

Figure 2:
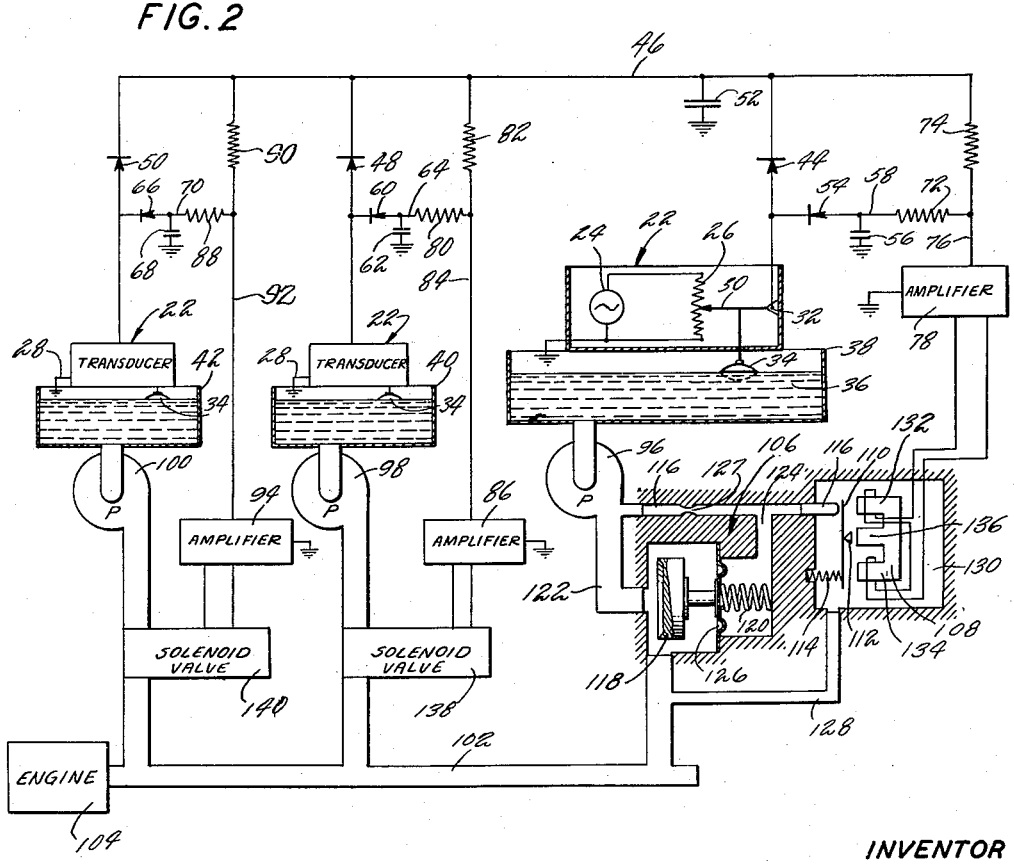
Fig. 2 is a schematic view showing three tanks with one form of detecting and comparing device and one form of flow control mechanism.
Figure 3:
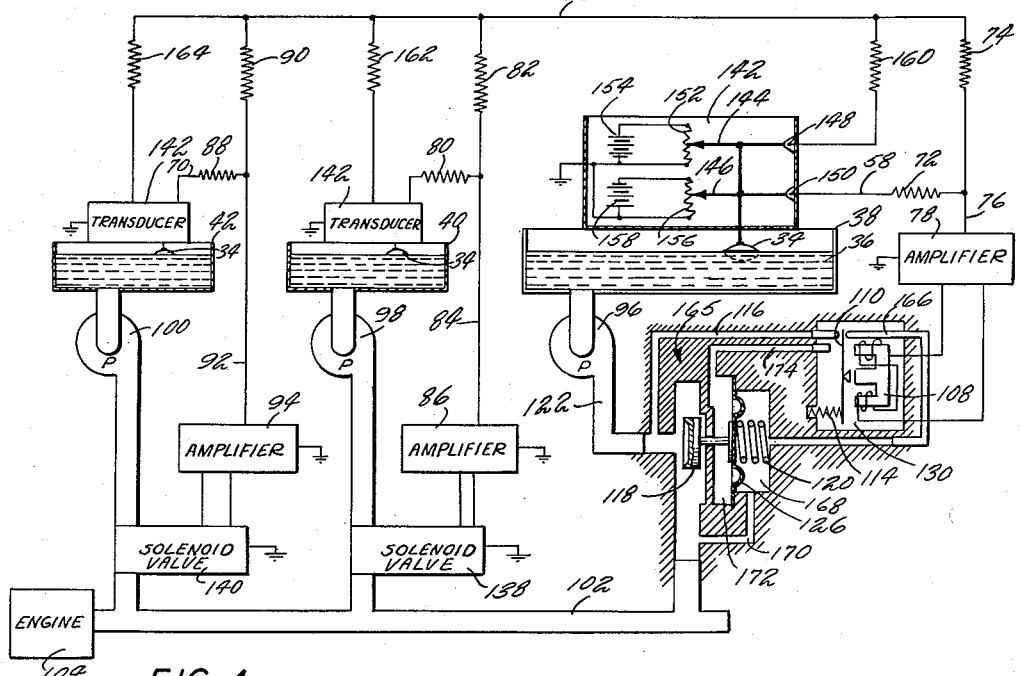
Fig. 3 is a schematic view showing three tanks with another form of detecting and comparing mechanism and another form of flow control mechanism.

The mechanism shown in Fig. 3 accomplishes a result similar to that shown in Fig. 1 but utilizes direct current instead of alternating current to energize the transducer and utilizes a double-acting valve 118 instead of the single-acting valve 118 to control the flow from the pump 96. In the structure shown in Fig. 3, the transducer 142 which is utilized to measure the fluid level in tank 38 utilizes a similar float 34 to that described in connection with Fig. 2 but the float now actuates two sliders 144 and 146 pivoted at 148 and 150, respectively. Slider 144 operates on potentiometer 152 connected across a D. C. source 154 and slider 146 operates on a potentiometer 156 connected across a D. C. source 158. The negative side of D. C. source 154 is grounded and the positive side of source 158 is grounded. Slider 144 is connected through resistor 160 to the common line 46. The transducer 142 in tank 40 is likewise connected through resistor 162 with common line 46 and the transducer 142 in tank 42 is connected through the resistor 164 with common line 46. The several transducers thus being connected to a common line will give line 46 a potential which is the average of the potential in the corresponding sliders 144 of all of the transducers 142. This differs from the structure shown in Fig. 2 in that while the common line 46 in Fig. 2 has a potential equal substantially to the greatest potential of any of the sliders, the common line 46 in Fig. 3 has a potential equal to the average of the potential of the several sliders. As in Fig. 2, line 46 is considered as having a positive potential with respect to ground although of course in both figures the connections could be reversed to provide the common line with a negative potential if desired.

The negative potential in slider 146 is compared with the positive potential of common line 46, by means of resistors 72 and 74 connecting slider 146 with line 46. The resultant of this comparison is led through line 76 to amplifier 78.

Potentiometers 156 and 152 are arranged so that as the fluid level in tank 38 rises, the potential taken off for sliders 144 and 146 will be increased, the potential in slider 144 becoming more positive and the potential in slider 146 becoming more negative. These potentials will remain preferably numerically substantially equal. The transducers in tanks 40 and 42 act in the same manner. Assuming as in Fig. 2 the tank 42 has a high level, tank 40 a medium level, tank 38 a low level and for this explanation assuming that the transducers in tank 40 are producing a potential fed into the line 46 which is equal to the average which would be half way between the potential produced by the transducer in tank 42 and the potential produced by the transducer in tank 48. The potential picked off by slider 144 will be numerically less than the average appearing in line 46 and the potential picked off by slider 146 being of opposite polarity but numerically the same as that produced by slider 144, will be numerically less than and of opposite polarity to the potential appearing on line 46. Assuming the resistors 72 and 74 to be equal, the potential appearing on line 76 will be positive and will represent the amount that the level of the fluid 36 in tank 38 differs from the average level of all the tanks. The transducer in tank 42 acting in the same manner will produce a negative voltage in line 70 numerically greater than the positive voltage in line 46 so that the resultant voltage in line 92 will be negative.

Solenoid actuated flapper valve 110 of Fig. 3 is a double-acting valve in that it can block the flow from pressure line 116 or the flow through drain line 166 in accordance with the direction of current flow through the solenoid 108. Blocking of the line 116 opens the line 166 which is connected through chamber 168 and line 170 with the manifold 102 and thus serves to open the chamber 172 on the valve side of diaphragm 126 secured to valve 118 to the pressure in the manifold, which pressure is always less than the pressure delivered by pump 96 into pressure line 122. Thus closing of the line 116 will act to relieve pressure in chamber 172 thus permitting the spring 120 to urge the valve 118 toward closed position. When valve 110 closes pipe 166, it opens line 116 to chamber 130 and blocks the vent from that chamber to the manifold 102. Line 174 being always open and connecting chambers 130 and 172 the pressure of line 116 is applied to the chamber 172 and through diaphragm 126 moves valve 118 against the action of spring 120 to an open position.

The electro magnet coils of solenoid 108 are connected so that in the example shown, a positive potential in line 76 when amplified will, after passing through the amplifier, act to move flapper valve 110 to close the line 116 and permit spring 120 to close valve 118. A negative signal in line 76 such as has been described as existing under the assumed conditions in line 92, would, after passing through the amplifier, actuate solenoid 108 and valve 110 in a direction to close line 166 and apply more pressure in line 174 and chamber 172 to open the valve.

Thus in the conditions assumed for Fig. 3, solenoid valve 140 would be opened; solenoid valve 138 whose amplifier would be receiving no signal would be unchanged and valve 118 controlling the outlet of tank 38 would be partly closed. The rate of discharge of the pump 100 would thus be increased and the rate of discharge of the pump 96 would thus be decreased to permit more rapid withdrawal of fluid from tank 42 and a slower withdrawal of fluid from tank 38 which has the low level. As in the device of Fig. 2, there may be all degrees of opening of the valve 118 between substantially closed and substantially wide open which valve positions are determined by the current flow in the proportional solenoid 108.

Figure 4:
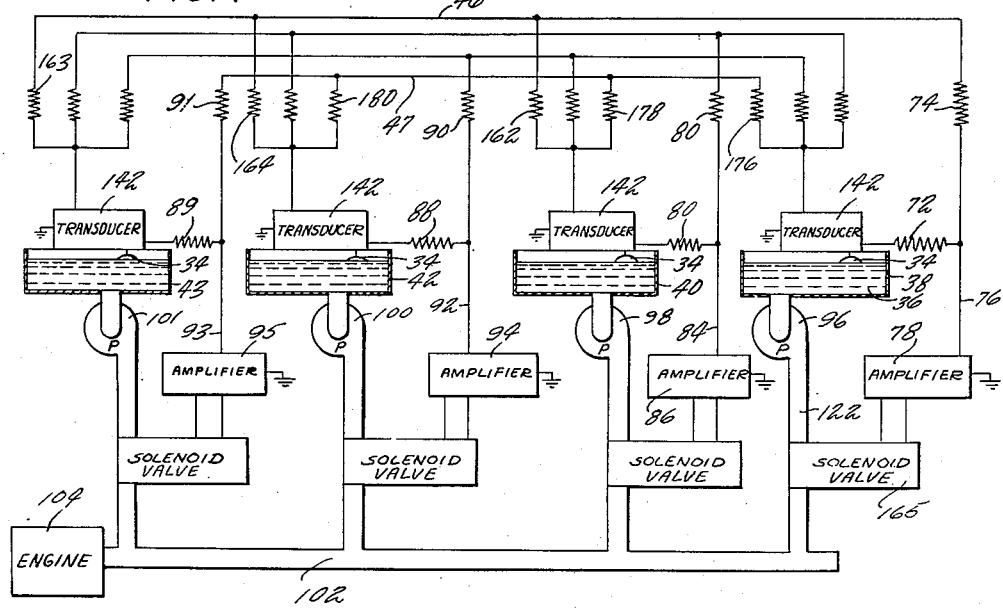
Fig. 4 is a schematic view similar to Fig. 3 but showing four tanks but with a modified form of comparing mechanism.

Fig. 4 shows another modification using the transducer 142 of Fig. 3 and the solenoid valve 165 of Fig. 3 but connecting the positive potential lead of the transducers so as to compare the level of any one tank with the average of the levels of all of the remaining tanks. Four tanks instead of the three shown in the other figures have been shown in Fig. 4 just to show how additional tanks may be added. It is obvious that although three tanks have been shown in the other figures, and four in Fig. 4, a larger or smaller number could be used.

The positive leads from transducer 142 in tank 40 is led through resistor 162 to common line 46. The corresponding lead from tank 42 is led through resistor 164 to common line 46. The corresponding lead from tank 43 is led through resistor 163 to common line 46. These three tanks are thus connected to a common line the same as the tanks in Fig. 3 are connected so as to produce a potential in line 46 which is an average of the transducers of the three selected tanks and is thus an indication of the average level of the fluid in those three tanks. The potential in line 46 is compared through resistors 72 and 74 with the negative potential from the transducer 142 in tank 38 to give a signal in line 76 which is a measure of the variation of the level in tank 38 from the average of the level in the other three tanks. In like manner each of the tanks is compared with the average of the level in all the other tanks. Taking tank 43, for example, the positive signal from the transducer 142 in tank 42 is led through resistor 180 to common line 47. The corresponding signal from tank 40 is led through resistor 178 to common line 47 and the corresponding signal from tank 38 is led through resistor 176 to common line 47. The voltage in common line 47 is compared with the negative voltage from the transducer in tank 43 through resistors 89 and 91 so that the voltage appearing in line 93 is an indication of the variation of the level in tank 43 from the average of the level of the fluid in tanks 38, 40 and 42. The signals in lines 76, 84, 92 and 93 are led through amplifiers and proportional solenoid valve mechanisms to control the flow from their respective tanks in the same manner as described for the amplifiers and valves of Fig. 3.

Figure 5:
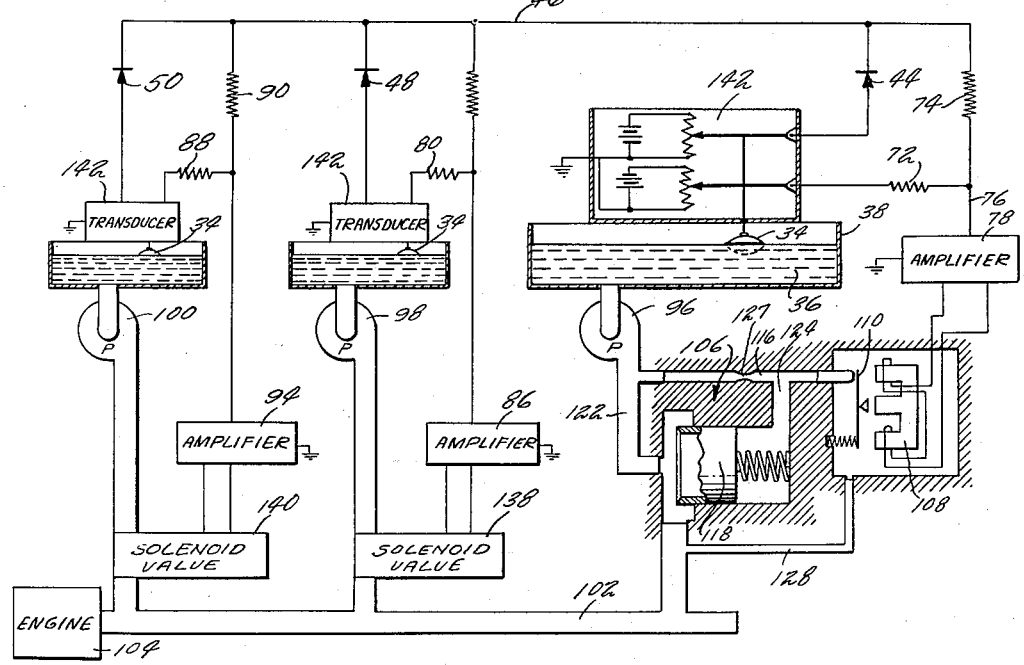
Fig. 5 is a schematic view showing three tanks with a detecting mechanism similar to Fig. 3 but with a comparing device and flow controlling mechanism similar to Fig. 2.

Fig. 5 is similar to the structure shown in Fig. 2 except that a direct current transducer similar to that described in connection with Fig. 3 is utilized and a sliding valve in place of the diaphragm valve is shown. The direct current led from each of the transducers 142 is led through rectifiers indicated at 44, 48 and 50 to give line 46 a potential corresponding to the highest potential of the several transducers. The negative voltage from the transducer of tank 38 is compared through resistances 72 and 74 with the potential of line 46 to give a signal in line 76 which is an indication of the variation of the level of the fluid in tank 38 from the highest fluid level of all the tanks in the manner described in connection with Fig. 2. The amplifiers and the solenoid valve mechanisms in Fig. 5 are the same as those shown in Fig. 2 except that valve 118 has been made in the form of a plunger slidable in a cylinder and diaphragm 126 has been omitted. Pressure back of valve slide 118 will act in a manner similar to pressure back of diaphragm 126 in Fig. 2.

Figure 6:
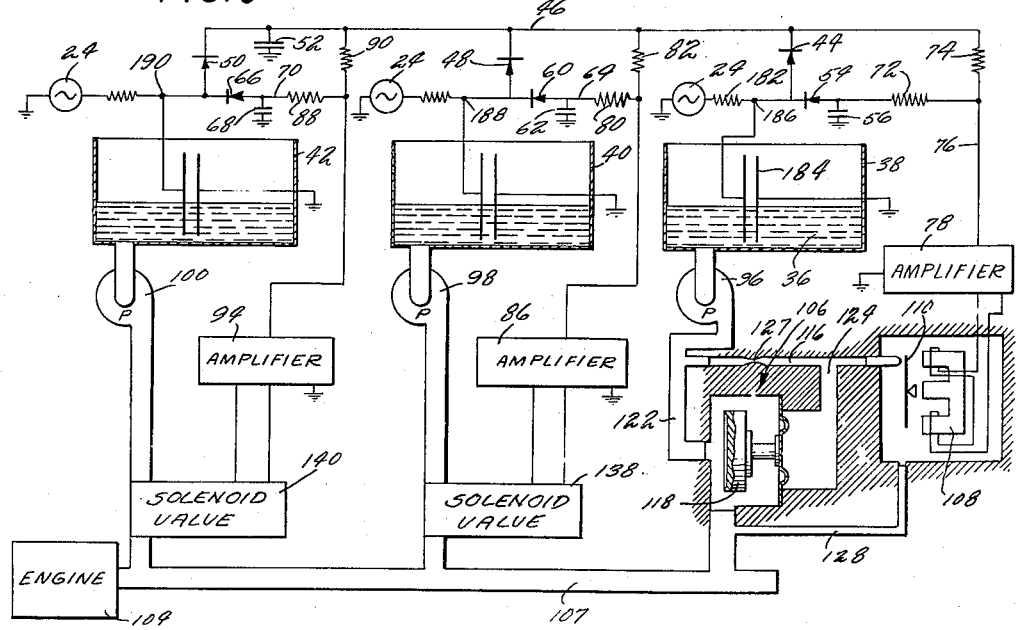
Fig. 6 is a schematic view similar to Fig. 2 but with a modified detecting device.

Fig. 6 shows a control mechanism similar to Fig. 2 except that a different form of transducer is utilized. For tank 38 a resistor 182 is connected in series with a condenser 184 across a source of alternating current 24. The capacity of the condenser 184 and hence its reactance varies in accordance with the portion of the condenser which is submerged which portion will of course vary with the fluid level in the tank. By making the resistance of resistor 182 at least three times the normal reactance of condenser 184, it is possible to obtain a signal at the junction 186 between the capacitor 184 and resistor 182 which varies almost directly with the fuel level. The alternating voltage at junction 186 is led through rectifiers 44 and 54 in the manner more fully described in connection with Fig. 2 to provide a signal in line 76 which is an indication of the variation of the flud level in tank 38, from the highest fluid level of the other tanks. The voltages produced at junctions 188 and 190 will vary in the manner indicated for the junction 186 to provide an alternating current signal which is an indication of the fluid level in the tanks 40 and 42, respectively. These alternating voltages are led through rectifiers 48 and 50 to, together with the voltages led through rectifiers 44, determine the voltage in line 46 in a manner described in connection with Fig. 2 to thereby give the reference voltage to which the voltages of rectifiers 54, 60 and 66 are compared. The amplifiers and solenoid actuated valve of Fig. 6 are the same as that of Fig. 2.

Although I have described five forms of the electrical level comparing and fluid controlling mechanisms, it is obvious that various other changes can be made which would come within the scope of this invention. For instance, I have described the reference voltage as a positive voltage but it is apparent that the reference voltage might be a negative voltage and a positive voltage might be compared therewith to provide the signal controlling the solenoid valve. Although I have shown only one way, a valve, for varying the pump output, other means might be used and although I have shown only one type of valve in the pump outlets for controlling the quantity of fuel discharged by the pump, it is obvious that other types of valves might be used and that a by-pass around the pump instead of a valve in the outlet line might be used and still come within the scope of the invention. The amplifier has been indicated only as a box because amplifiers are well known and further description is believed to be unnecessary. The function of the amplifier is to amplify the incoming signal sufficiently to provide power enough to operate the solenoid. Other changes may obviously be made and come within the scope of this invention which is limited only by the appended claims.

I claim:

1. Means for regulating fluid flow from a plurality of simultaneously discharging tanks each having an outlet for fluid flow therefrom, comprising means detecting the fluid level in each of several tanks and creating a fluid level signal for each tank, means creating a reference signal which is a function of the fluid levels in selected tanks, means comparing said fluid level signals with said reference signal and means responsive to any difference between said fluid level signals and said reference signal for adjusting the fluid flow from the respective tank in accordance with said difference.

2. Means for regulating fluid flow from a plurality of simultaneously discharging tanks comprising means creating a signal for each tank varying with the liquid level in the respective tank, means producing a reference signal from said created signals, means connecting a created signal with said reference signal including means producing a resultant signal indicating departure of said created signal from said reference signal, flow control means for each tank, means connecting the resultant signal and the flow control means of each tank including means actuated by the resultant signal for actuating its connected flow control, means to regulate the flow from its associated tank to equalize the fluid level in the associated tank with the fluid level in other tanks.

3. Means for regulating the fluid flow from a plurality of simultaneously discharging tanks comprising an individual transducer for each tank for producing an electrical signal which is a function of the fuel level in the respective tank, means for producing a reference electrical signal which is a function of the fluid level in selected tanks, means comparing the signal from individual tanks with the reference signal and producing individual resultant electrical signals, flow control means for each tank and means responsive to said individual resultant signals for actuating said flow control means of the respective tank.

4. Means for regulating the fluid flow from a plurality of simultaneously discharging tanks comprising an individual transducer for each tank for producing electrical signals which are a function of the fuel level in the respective tank, means for comparing signals from selected tanks for producing a reference signal, means comparing signals from individual tanks with the reference signal and producing resultant signals for individual tanks, flow control means for the individual tanks and means responsive to said resultant signal for an individual tank for actuating said flow control means to control the flow from the individual tank associated with said resultant signal.

5. Means for regulating the fluid flow from a plurality of simultaneously discharging tanks comprising an individual transducer for each tank for producing electrical signals which are a function of the fuel level in the respective tanks, means for combining the signals from selected tanks for producing a reference signal, means comparing signals from individual tanks with the reference signals and producing resultant signals for individual tanks, flow control means for the individual tanks and means responsive to said resultant signals for individual tanks for actuating said flow control means to control the flow from the individual tank.

6. Means for regulating the fluid flow from a plurality of simultaneously discharging tanks comprising an individual transducer for each tank for producing electrical signals which are a function of the fluid level in the respective tank, means automatically selecting the greatest signal from selected tanks and utilizing that greatest signal as a reference signal, means comparing signals from individual tanks with the reference signal and producing resultant signals for individual tanks, flow control means for the individual tanks and means responsive to said resultant signal for actuating said flow control means to control the flow from the individual tank.

7. Means for regulating the fluid flow from a plurality of simultaneously discharging tanks comprising an individual transducer for each tank for producing electrical signals which are a function of the fluid level in the respective tank, means automatically selecting one of said tanks as a master and signals from said selected master tank as a reference signal, means comparing signals from individual tanks with the reference signal and producing resultant signals for individual tanks, flow control means for the individual tanks and means responsive to said resultant signal for actuating said flow control means to control the flow from the individual tank.

8. Means for maintaining the horizontal center of gravity position of several horizontally spaced liquid containing tanks while being simultaneously emptied comprising means creating a pair of signals for each tank each half of the pair varying with the liquid level in that tank, means producing a reference signal from one half of selected ones of the several pairs of signals, flow control means for each tank, and means responsive to any signal of the other half of the pairs of signals departing from said reference signal for actuating the flow control means to control the flow from the tank producing the departing signal.

9. Means for regulating fluid flow from a plurality of simultaneously discharging tanks comprising an individual transducer for each tank for producing signals of substantially equal value but of opposite polarity varying in value in accordance with the quantity of fluid in the respective tank, means for producing a reference electrical signal from said produced signals of one polarity which is a function of the quantity of fluid in selected tanks, means comparing signals of the other polarity from individual tanks with said reference signal and producing a resultant electrical signal for individual tanks, flow control means for the individual tanks and means responsive to the resultant signal for controlling the fluid flow from the individual tanks by actuating the flow control means for the individual tanks.

10. Means for controlling the fluid flow from a plurality of tanks comprising an individual transducer for each tank for producing electrical signals in accordance with the quantity of fluid in the respective tank, flow control means associated with the outlet of each tank for controlling the flow from the respective tank, means for combining signals from selected tanks to produce resultant signals which are a function of the quantity of fluid in the selected tanks, means electrically comparing signals from the remainder of said tanks with said combined signals to produce a control signal for each tank of said remainder, and means responsive to the control signal for each tank for actuating the flow control means for the respective tank.

11. Means for regulating the fluid flow from a plurality of simultaneously discharging fluid containing tanks comprising a transducer for each tank for producing electrical signals which are a function of the fluid level in the respective tanks, means creating a reference signal which is a function of the fluid level in less than all of said tanks, means for comparing signals from the remainder of said tanks with said reference signal and producing a separate resultant signal for each respective tank of said remainder, means individually controlling the flow from each tank, and means responsive to said separate resultant signal for actuating the respective controlling means.

12. A device as in claim 3 in which the flow control means is a control valve in the tank outlet and the valve actuating means comprises a servomotor, a pilot valve controlling said servomotor and an electrically actuated device positioning said pilot valve.

13. A device as in claim 12 in which one side of said servomotor is connected with the tank outlet on the upstream side of said control valve, and said one side is also connected with the tank outlet on the downstream side of said control valve and said pilot valve is arranged between said connections to variably restrict the flow through said connections.

14. A device as in claim 13 in which the connection between said servomotor and the upstream side of said outlet is between said upstream side of said outlet and said pilot valve.

15. A device as in claim 13 in which the pilot valve is located between said servomotor and said outlet in the connection connecting the outlet on the upstream side of said valve with said servomotor.

16. A device as in claim 13 in which the connection between the tank outlet on the upstream side of said valve and said one side of said servomotor comprises an open end pipe and the electrically actuated device comprises a polarized electromagnet and the pilot valve comprises a pivoted arm arranged across the pole pieces of said magnet and adapted to be moved thereby in accordance with the signal strength in said magnet, said arm also arranged across the open end of said pipe to vary the size of said opening.

17. A device as in claim 6 in which the flow control means comprises a valve in the tank outlet and the flow control actuating means comprises a servomotor connected with said valve, a line connecting one side of said servo with said outlet, a vent from said line, and a pilot valve controlling said vent.

18. A device as in claim 17 in which the pilot valve comprises a pivoted arm, arranged across the pole pieces of a polarized electromagnet and adapted to be moved thereby in accordance with the signal strength in said magnet, said arm also arranged across the end of said vent to vary the size of said vent opening.

19. A device as in claim 11 in which the transducer comprises a source of alternating voltage and means connected with said source selecting a portion of said voltage in accordance with the fluid level in said tank, a first rectifier connected with said selected portion for supplying a first voltage of one polarity, a second rectifier connected in the opposite direction with said portion to supply a voltage substantially equal to said first voltage but of the opposite polarity, separate condensers connected with the output of said second rectifier, said means for creating a reference signal comprising means connecting the output of the first rectifiers of several tanks together to give a reference signal substantially equal to the greatest signal, and a filter condenser connected with the output of said first rectifiers, said comparing means comprising separate pairs of resistances connected between each of said second rectifiers and the combined output of said first rectifiers.

20. A device as in claim 19 in which said selecting means comprises a condenser immersed in the fluid in the respective tank in accordance with the fluid level therein.

21. A device as in claim 11 in which the transducer comprises two sources of direct current voltage of opposite polarity, and means selecting a substantially equal portion of each voltage in accordance with the fluid level in the respective tank and the means creating a reference signal comprises means interconnecting the selected portions of one polarity from several tanks.

22. In an airplane having a plurality of separate fuel tanks spaced from the center of gravity of the plane, means for withdrawing fuel from the several tanks simultaneously, means for regulating the rate of withdrawal of fuel from the separate tanks to automatically equalize the fuel level in the several tanks and avoid shifting of the center of gravity, comprising a pump for each tank connected with the outlet of its respective tank for withdrawing fuel therefrom, means connecting the outlets of the several pumps to a common outlet and means for individually regulating the outputs of said pumps, said regulating means comprising means producing electrical signals of substantially equal value but of opposite polarity for each tank in accordance with the quantity of fuel in the respective tank, means for producing a reference electrical signal from said produced signals of one polarity which is a function of the quantity of fluid in selected tanks, means comparing signals of the other polarity from individual tanks with said reference signal and producing a resultant electrical signal for individual tanks, a valve in each tank outlet downstream of the pump, a servomotor for actuating said valve, a pilot valve controlling said servomotor and a polarized electromagnet connected with said pilot valve and responsive to the resultant signal for actuating said control valve for the individual tanks.

References Cited in the file of this patent

UNITED STATES PATENTS

| | | |
|---|---|---|
| 2,130,929 | Rocard | Sept. 20, 1938 |
| 2,356,786 | Harman et al. | Aug. 29, 1944 |
| 2,509,629 | De Giers et al. | May 30, 1950 |
| 2,652,555 | Smith | Sept. 15, 1953 |
| 2,759,424 | Defibaugh et al. | Aug. 21, 1956 |

UNITED STATES PATENT OFFICE
CERTIFICATE OF CORRECTION

Patent No. 2,840,097                      June 24, 1958

Thomas P. Farkas

It is hereby certified that error appears in the printed specification of the above numbered patent requiring correction and that the said Letters Patent should read as corrected below.

Column 8, line 35, after "control", strike out the comma; lines 41, 53 and 65, for "fuel", each occurrence, read -- fluid --; same column 8, line 69, for "signals", first occurrence", read -- signal --.

Signed and sealed this 11th day of April 1961.

(SEAL)
Attest:
ERNEST W. SWIDER
Attesting Officer

ARTHUR W. CROCKER
Acting Commissioner of Patents